(12) United States Patent
Feng (10) Patent No.: US 9,396,386 B2
(45) Date of Patent: Jul. 19, 2016

(54) INFORMATION PROCESSING METHOD, SYSTEM AND ELECTRONIC DEVICE

(71) Applicants: Beijing Lenovo Software Ltd., Beijing (CN); Lenovo (Beijing) Co., Ltd., Beijing (CN)

(72) Inventor: Xiaoyi Feng, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 4 days.

(21) Appl. No.: 14/499,635

(22) Filed: Sep. 29, 2014

(65) Prior Publication Data

US 2015/0235078 A1  Aug. 20, 2015

(30) Foreign Application Priority Data

Feb. 18, 2014  (CN) .......................... 2014 1 0054125

(51) Int. Cl.
*G06K 9/00* (2006.01)
*G06F 3/01* (2006.01)

(52) U.S. Cl.
CPC ............ *G06K 9/00375* (2013.01); *G06F 3/017* (2013.01); *G06K 9/00624* (2013.01)

(58) Field of Classification Search
CPC .................................... G06K 9/00; G06F 3/01
USPC ........................................................ 382/103
See application file for complete search history.

(56) References Cited

U.S. PATENT DOCUMENTS

| | | | | |
|---|---|---|---|---|
| 2011/0288964 A1* | 11/2011 | Linder | ................... | B25J 9/1689 705/27.1 |
| 2013/0257748 A1* | 10/2013 | Ambrus | ............. | G02B 27/0093 345/173 |
| 2015/0181111 A1* | 6/2015 | Stewart | .............. | H04N 5/23219 348/211.8 |

* cited by examiner

*Primary Examiner* — Gregory F Cunningham
(74) *Attorney, Agent, or Firm* — Harness, Dickey & Pierce, P.L.C.

(57) ABSTRACT

An information processing method, system and an electronic device are provided according to the embodiments of the disclosure, and applied to an electronic device having at least a first panel, with a first surface of the first panel being provided with a display unit and at least one image acquisition apparatus, where the at least one image acquisition apparatus is positioned below the display unit in the case that the first panel stands on a plane. After an image for a to-be-recognized object and the plane is acquired by the image acquisition apparatus, whether the object contacts the plane is determined based on the acquired image, and information about position change on the object is detected in the case that it is determined that the object contacts the plane.

18 Claims, 8 Drawing Sheets

INFORMATION PROCESSING METHOD, SYSTEM AND ELECTRONIC DEVICE

CROSS-REFERENCES TO RELATED APPLICATIONS

This application claims priority to Chinese Patent Application No. 201410054125.2, entitled "INFORMATION PROCESSING METHOD, SYSTEM AND ELECTRONIC DEVICE", filed with the Chinese State Intellectual Property Office on Feb. 18, 2014, which is incorporated herein by reference in its entirety.

BACKGROUND

1. Technical Field

The disclosure relates to the field of information processing technology, and in particular to an information processing method, system and electronic device.

2. Related Art

With the rapid development of electronic technology, implementation of controlling an electronic device by gesture recognition is more and more widely applied. However, in the conventional technology, it is necessary to make a hand in the suspending state in performing control, which is easy to make a user fatigued, the control accuracy is low.

SUMMARY

There is provided an information processing method, applied to an electronic device, and the method includes: acquiring an image for a to-be-recognized object and the plane by the at least one image acquisition apparatus; determining whether the to-be-recognized object contacts the plane based on the acquired image; and detecting position-changed information of the to-be-recognized object in the case that it is determined that the to-be-recognized object contacts the plane.

There is provided an information processing system, applied to an electronic device having at least a first panel, with a first surface of the first panel being provided with at least one image acquisition apparatus, wherein the at least one image acquisition apparatus acquires an image for a to-be-recognized object and the plane, and the system includes: a determination module, configured to determine whether the to-be-recognized object contacts the plane based on the image acquired by the at least one image acquisition apparatus; and a detection module, configured to detect position-changed information of the to-be-recognized object in the case that the determination module determines that the to-be-recognized object contacts the plane.

There is provided an electronic device, which includes: at least a first panel stands on a plane; at least one image acquisition apparatus provided on a first surface of the first panel; a determination module, configured to determine whether a to-be-recognized object contacts the plane based on the image acquired by the at least one image acquisition apparatus; and a detection module, configured to detect position-changed information of the to-be-recognized object in the case that the determination module determine that the to-be-recognized object contacts the plane.

BRIEF DESCRIPTION OF THE DRAWINGS

In order to illustrate the technical solutions according to the embodiments of the present disclosure or in the conventional art more clearly, drawings to be used in the description of the prior art or the embodiments will be described briefly hereinafter. Apparently, the drawings described hereinafter are only a few of embodiments of the present disclosure, and other drawings may be obtained by those skilled in the art according to those drawings without creative labor.

In the specification and claims and the drawings, terms "first", "second", "third", "fourth", etc. (if exists) are used to distinguish between similar parts, without the meaning of necessarily describing a particular order or priority. It should be understood that data used in such a way are interchangeable under appropriate circumstances, so that the embodiments of the disclosure described herein can be implemented in an order other than the orders illustrated herein.

DETAILED DESCRIPTION OF THE EMBODIMENTS

The technical solutions in the embodiments of the present disclosure will be described clearly and completely hereinafter in conjunction with the drawings. Apparently, the embodiments described are only a part but not all of the embodiments of the disclosure. All the other embodiments obtained by those skilled in the art without creative effort on the basis of the embodiments of the disclosure fall within the scope of protection of the present disclosure.

An information processing method according to an embodiment of the disclosure is applied to an electronic device having at least a first panel, with a first surface of the first panel being provided with a display unit and at least one image acquisition apparatus. In the case that the first panel inclinedly stands on a plane (such as a tabletop or other places where the electronic device may be placed), the at least one image acquisition apparatus is positioned below the display unit, as shown in FIG. 1, which is a schematic diagram of a position relationship between the display unit provided on the first surface of the first panel and the at least one image acquisition apparatus.

Figure 2:
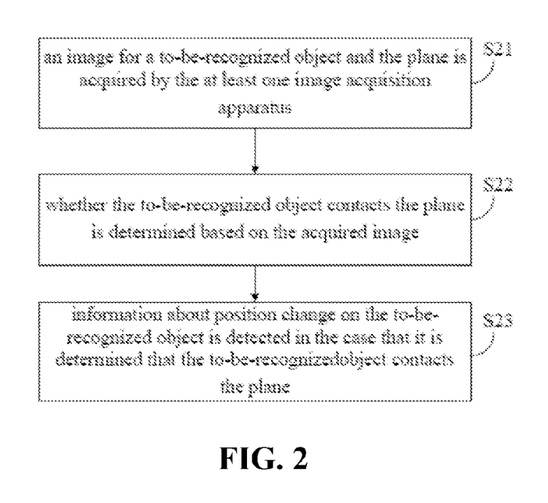
FIG. 2 is a flow chart of an information processing method according to an embodiment of the disclosure.

Referring to FIG. 2, which is a flow chart of an information processing method according to an embodiment of the disclosure, the method includes the following steps S21, S22, and S23.

In step S21, an image for a to-be-recognized object and the plane is acquired by the at least one image acquisition apparatus.

Figure 1:
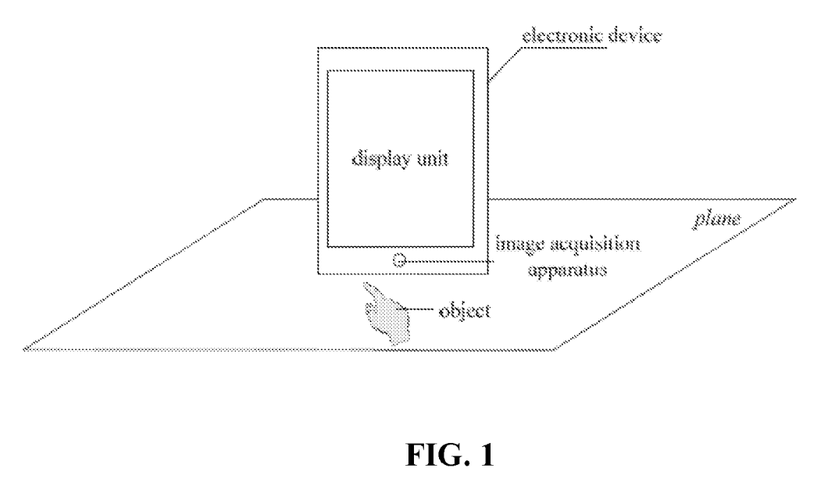
FIG. 1 is a schematic structural diagram of electronic device according to an embodiment of the disclosure.

As shown in FIG. 1, in the case that the first panel of the electronic device inclinedly stands on the plane, the at least one image acquisition apparatus is positioned at a lower part of a side of the electronic device near the plane, therefore, an image for the plane where the electronic device is placed may be acquired. In the case that there is an object within a visual range of the image acquisition apparatus, an image for the object may also be acquired by the image acquisition apparatus.

In step S22, whether the to-be-recognized object contacts the plane is determined based on the acquired image.

In the case that the image for the to-be-recognized object is acquired, whether the to-be-recognized object contacts the plane where the electronic device is placed is determined based on the acquired image.

In step S23, position-changed information of the to-be-recognized object is detected in the case that it is determined that the to-be-recognized object contacts the plane.

In the embodiment of the disclosure, the position-changed information of the to-be recognized object is detected in the case that it is determined that the to-be recognized object contacts the plane where the electronic device is placed. For example, assumed that the to-be recognized object is a hand of a person, then the position-changed information of the hand of the person is detected in the case that it is determined that the hand contacts the plane where the electronic device is placed.

An information processing method according to the disclosure is applied to an electronic device having at least a first panel, with a first surface of the first panel being provided with a display unit and at least one image acquisition apparatus. In the case that the first panel inclinedly stands on a plane, the at least one image acquisition apparatus is positioned below the display unit. After an image for a to-be recognized object and the plane is acquired by the image acquisition apparatus, whether the to-be recognized object contacts the plane is determined based on the acquired image, and position-changed information of the to-be recognized object is detected in the case that it is determined that the to-be recognized object contacts the plane, that is, the object is effectively recognized in the case that the object is on the plane where the electronic device is placed. Therefore, when a user performs control to the electronic device through gestures, the user performs gesture transformations on the plane where the electronic device is placed, without performing gesture transformations in a suspending state, it is convenient for the user, and the user is not easy to be fatigued. Moreover, as compared with a suspending movement of a hand of the user, a movement of the hand on the plane where the electronic device is placed is easier to control. Therefore, position detection for the object to be recognized is more accurate, and thus improving control accuracy.

In the above embodiment, the electronic device may have only the first panel. For example, the electronic device may be a tablet computer.

Figure 3:
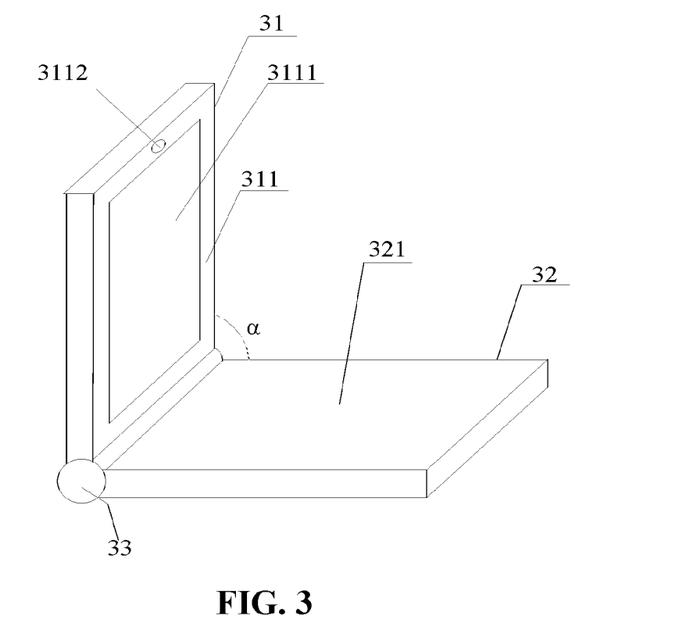
FIG. 3 is a schematic diagram of electronic device according to an embodiment of the disclosure in a laptop mode.
Figure 4:
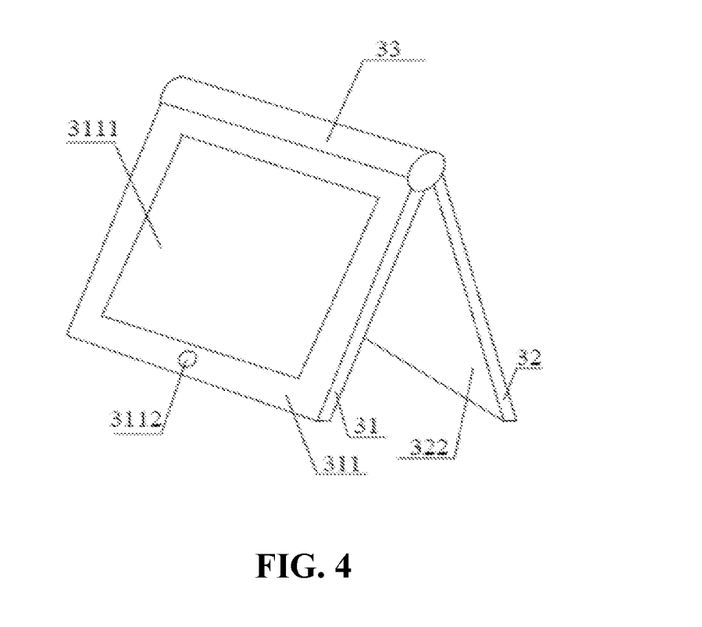
FIG. 4 is a schematic diagram of electronic device according to an embodiment of the disclosure in a tent mode.

The electronic device may also have the first panel and a second panel, the first panel and the second panel are movably connected through a rotating shaft. For example, the electronic device may be a laptop computer. In the embodiment of the disclosure, in the case that the electronic device has the first panel and the second panel, the electronic device may have at least two usage modes. One of the usage modes is a laptop mode, as shown in FIG. 3, a first panel 31 and a second panel 32 are movably connected to a rotating shaft 33; and in the case that the first panel 31 and the second panel 32 are closed, a first surface 311 of the first panel 31 is near a first surface 321 of the second panel 32. A display unit 3111 and at least one image acquisition apparatus 3112 are provided on the first surface 311 of the first panel 31, and the at least one image acquisition apparatus 3112 is positioned above the display unit 3111. The other one of the usage modes is a tent mode, as shown in FIG. 4, the at least one image acquisition apparatus 3112 is positioned below the display unit 3111 of the first panel, and an angle α between the first surface 311 of the first panel 31 and the first surface 321 (i.e., an opposite surface to a second surface 322 of the second panel) of the second panel is greater than 180 degree.

Figure 5:
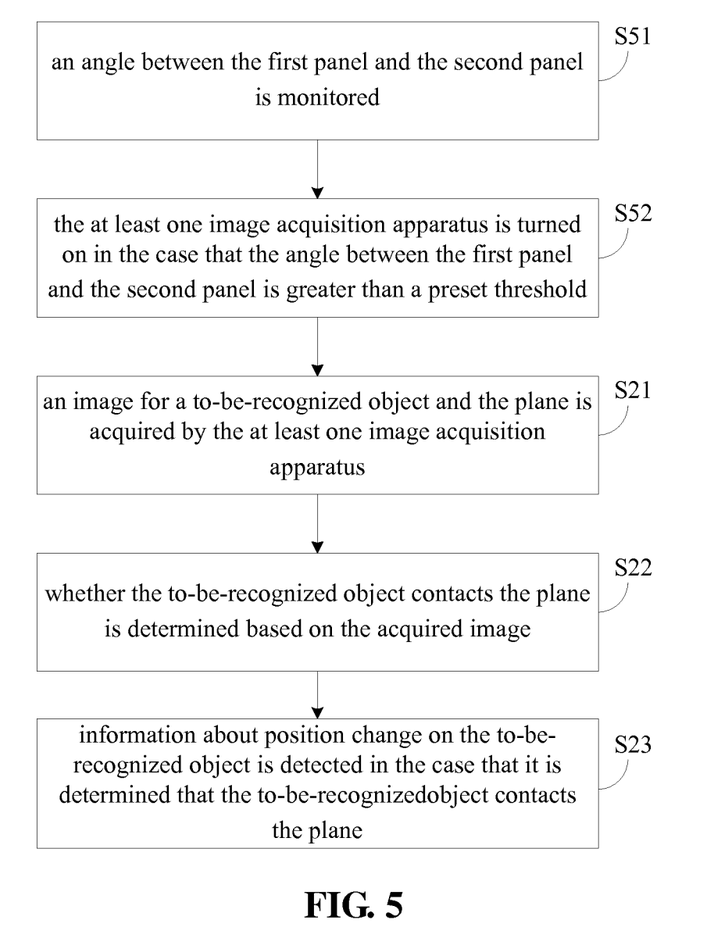
FIG. 5 is a flow chart of another information processing method according to an embodiment of the disclosure.

In the case that the electronic device has the first panel and the second panel, a flow chart of another information processing method according to an embodiment of the disclosure is shown in FIG. 5, and before an image for an to-be-recognized object is acquired by the at least one image acquisition apparatus, the following steps S51, S52 may also be included.

In step S51, an angle between the first panel and the second panel is monitored.

In the embodiment of the disclosure, the angle between the first panel and the second panel becomes less gradually, when the first surface of the first panel and the first surface of the second panel is approaching each other; the angle between the first panel and the second panel becomes greater gradually, when the first surface of the first panel and the first surface of the second panel is keeping away from each other.

In step 52, the at least one image acquisition apparatus is turned on in the case that the angle between the first panel and the second panel is greater than a preset threshold.

In the embodiment of the disclosure, in the case that the angle between the first panel and the second panel is greater than the preset threshold, it is indicated that the electronic device is in a tent mode, as shown in FIG. 4.

That is, in the embodiment of the disclosure, in the case that the electronic device is in the tent mode, the at least one image acquisition apparatus is turned on automatically, without turning on the at least one image acquisition apparatus manually by a user, and thus operation by the user is simplified.

Figure 6:
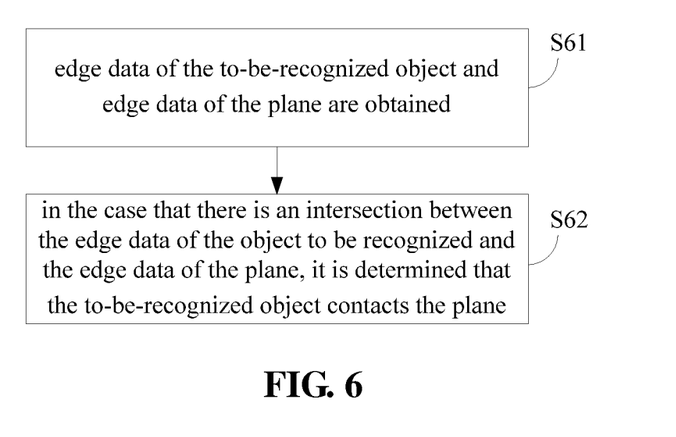
FIG. 6 is a flow chart of an implementation of determining whether a to-be-recognized object contacts a plane based on an acquired image according to an embodiment of the disclosure.

According to the above embodiments, optionally, in the case that the first surface of the first panel is provided with one image acquisition apparatus, a flow chart of an implementation of determining whether the to-be-recognized object contacts a plane based on an acquired image is shown in FIG. 6, and may include the following steps S61 and S62.

In step S61, edge data of the to-be-recognized object and edge data of the plane are obtained.

Each time one image is acquired by the image acquisition apparatus, an edge feature of the to-be-recognized object and an edge feature of the plane are extracted, and thus obtaining the edge data of the object in the image and the edge data of the plane in the image.

In step S62, in the case that there is an intersection between the edge data of the to-be-recognized object and the edge data of the plane, it is determined that the to-be-recognized object contacts the plane.

Figure 7:
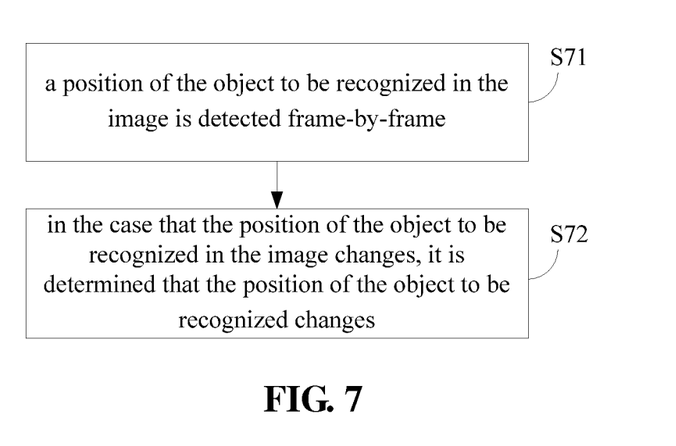
FIG. 7 is a flow chart of an implementation of detecting position-changed information of a to-be-recognized object according to an embodiment of the disclosure.

On the basis of the embodiment shown in FIG. 6, a flow chart of a specific implementation of detecting position-changed information of the to-be-recognized object according to an embodiment of the disclosure is shown in FIG. 7, and may include the following steps S71 and S72.

In step S71, a position of the to-be-recognized object in the image is detected frame-by-frame.

After it is determined that the to-be-recognized object contacts the plane, each time a frame of image is acquired, the position of the to-be-recognized object in the image is detected once.

In the step S72, in the case that the position of the to-be-recognized object in the image changes, it is determined that the position of the to-be-recognized object changes.

In the case that the position of the to-be-recognized object in the current frame of image is different from the position of the to-be-recognized object in the previous frame of image, it is indicated that the position of the to-be-recognized object in the plane changes, i.e., the physical position of the to-be-recognized object changes.

Figure 8:
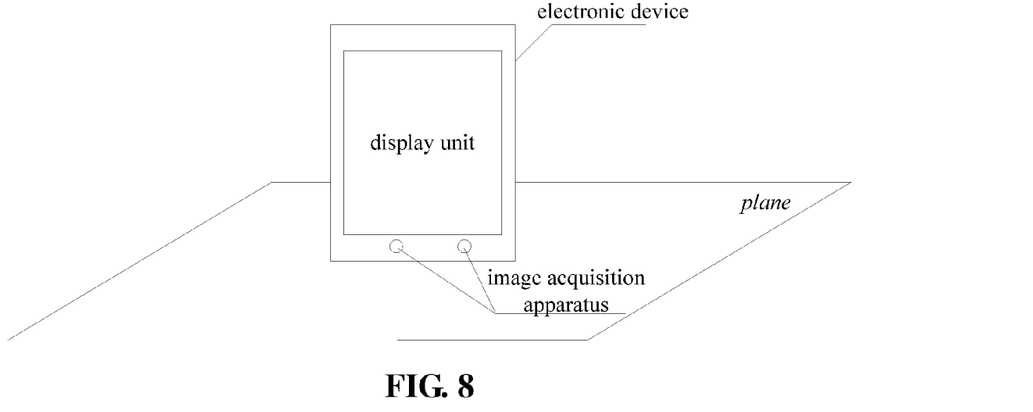
FIG. 8 is a schematic structural diagram of another electronic device according to an embodiment of the disclosure.
Figure 9:
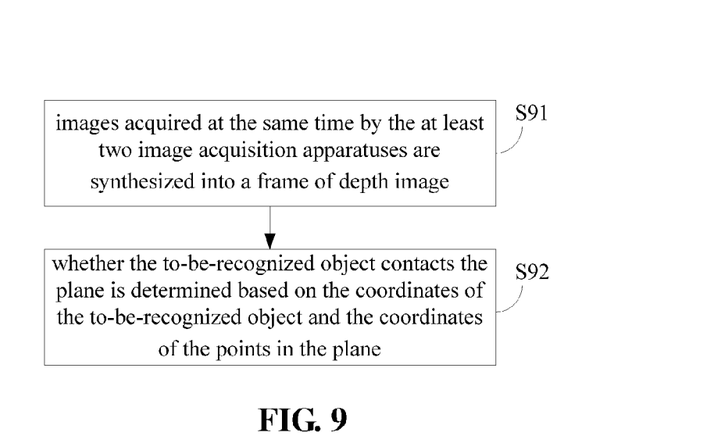
FIG. 9 is a flow chart of another implementation of determining whether a to-be-recognized object contacts a plane based on an acquired image according to an embodiment of the disclosure.

According to the above embodiments, optionally, in the case that the first surface of the first panel is provided with at least two image acquisition apparatuses, as shown in FIG. 8, a schematic structural diagram of another electronic device according to an embodiment of the disclosure is shown in FIG. 8, and accordingly, a flow chart of a specific implementation of determining whether the to-be-recognized object contacts a plane based on an acquired image is shown in FIG. 9, and may include the following steps S91 and S92.

In step S91, images acquired at the same time by the at least two image acquisition apparatuses are synthesized into a frame of depth image that carries coordinates of the object to be recognized and coordinates of points in the plane.

A frame of image is acquired at each time by each of the image acquisition apparatuses. In the embodiment of the disclosure, images acquired at the same time by the image acquisition apparatuses are synthesized into a frame of depth image, and how to perform the synthesis specifically is of common general knowledge in the art, which is not detailed any more.

In step S92, whether the to-be-recognized object contacts the plane is determined based on the coordinates of the to-be-recognized object and the coordinates of the points in the plane.

Specifically, in the case that the coordinate of at least one point of the to-be-recognized object coincide with the coordinate of at least one point of the plane, it is indicated that the to-be-recognized object contacts the plane.

Figure 10:
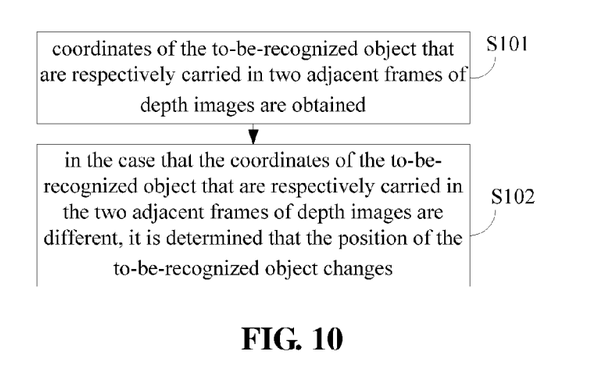
FIG. 10 is a flow chart of another implementation of detecting position-changed information of a to-be-recognized object according to an embodiment of the disclosure.

On the basis of the embodiment shown in FIG. 9, a flow chart of another implementation of detecting information about position change on a to-be-recognized object to according to an embodiment of the disclosure is shown in FIG. 10, and may include the following steps S101 and S102.

In step S101, coordinates of the to-be-recognized object that are respectively carried in two adjacent frames of depth images are obtained.

In the embodiment of the disclosure, whether the position of the to-be-recognized object changes is determined based on positions of the to-be-recognized object in the depth images.

In step S102, in the case that a first group of coordinates of the to-be-recognized object and a second group of coordinates of the to-be-recognized object that are respectively carried in the two adjacent frames of depth images are different, it is determined that the position of the to-be-recognized object changes.

Optionally, in the case that coordinates of the to-be-recognized object in a depth image acquired at the current time are different from coordinates of the to-be-recognized object in a depth image acquired at the previous time, it is determined that the position of the to-be-recognized object in the plane changes, i.e., the physical position of the to-be-recognized object changes.

According to the above embodiments, optionally, in the case that it is detected that the to-be-recognized object separates from the plane, the position-changed information of the to-be-recognized object stops being detected.

In the embodiments of the disclosure, in order to reduce power consumption, in the case that it is detected that the to-be-recognized object separates from the plane, the detection for the position-changed information of the to-be-recognized object stops.

Figure 11:
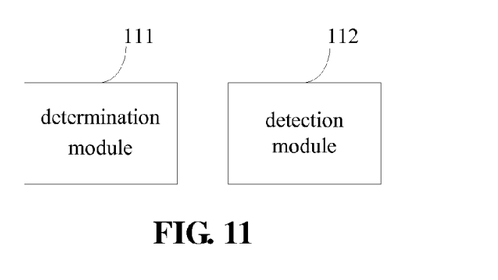
FIG. 11 is a schematic structural diagram of an information processing system according to an embodiment of the disclosure.

Correspondingly to the embodiments of the method, there is also provided an information processing system according to an embodiment of the disclosure, the information processing system is applied to an electronic device having at least a first panel, with a first surface of the first panel being provided with a display unit and at least one image acquisition apparatus. In the case that the first panel stands on a plane, the at least one image acquisition apparatus is positioned below the display unit, and the at least one image acquisition apparatus acquires an image for a to-be-recognized object and the plane. A schematic structural diagram of an information processing system according to an embodiment of the disclosure is shown in FIG. 11, and may include a determination module 111 and a detection module 112.

Specifically, the determination module 111 is configured to determine whether the to-be-recognized object contacts the plane based on the image acquired by the at least one image acquisition apparatus.

Specifically, the detection module 112 is configured to detect position-changed information of the to-be-recognized object in the case that the determination module 111 determines that the to-be-recognized object contacts the plane.

In the embodiment of the disclosure, the position-changed information of the to-be-recognized object is detected in the case that it is determined that the to-be-recognized object contacts the plane where the electronic device is placed. For example, assumed that the to-be-recognized object is a hand of a person, then the position-changed information of the hand of the person is detected in the case that it is determined that the hand contacts the plane where the electronic device is placed.

An information processing system according to the disclosure are applied to an electronic device having at least a first panel, with a first surface of the first panel being provided with a display unit and at least one image acquisition apparatus. In the case that the first panel stands on a plane, the at least one image acquisition apparatus is positioned below the display unit. After an image for a to-be-recognized object and the plane is acquired by the image acquisition apparatus, whether the to-be-recognized object contacts the plane is determined by the determination module based on the acquired image, and position-changed information of the to-be-recognized object is detected by the detection module in the case that the determination module determines that the to-be-recognized object contacts the plane, that is, the object is effectively recognized in the case that the object is on the plane where the electronic device is placed. Therefore, when a user performs control to the electronic device through gestures, the user performs gesture transformations on the plane where the electronic device is placed, without performing gesture transformations in a dangle, it is convenient for the user, and the user is not easy to be fatigued. Moreover, as compared with a suspending movement of a hand of the user, a movement of the hand on the plane where the electronic device is placed is easier to control. Therefore, position detection for the to-be-recognized object is more accurate, and thus improving control accuracy.

In the above embodiment, the electronic device may have only the first panel. For example, the electronic device may be a tablet computer.

The electronic device may also have the first panel and a second panel, and the first panel and the second panel are movably connected through a rotating shaft. For example, the electronic device may be a laptop computer. In the embodiment of the disclosure, in the case that the electronic device has the first panel and the second panel, the electronic device may have at least two usage modes. One of the usage modes is a laptop mode, as shown in FIG. 3, a first panel 31 and a second panel 32 are movably connected to a rotating shaft 33; and in the case that the first panel 31 and the second panel 32 are closed, a first surface 311 of the first panel 31 is near a first surface 321 of the second panel 32. A display unit 3111 and at least one image acquisition apparatus 3112 are provided on the first surface 311 of the first panel 31, and the at least one image acquisition apparatus 3112 is positioned above the display unit 3111. The other one of the usage modes is a tent mode, as shown in FIG. 4, the at least one image acquisition apparatus 3112 is positioned below the display unit 3111 of the first panel, and an angle between the first surface 311 of the first panel 31 and the first surface 321 (i.e., an opposite surface to a second surface 322 of the second panel) of the second panel is greater than 180 degree.

Figure 12:
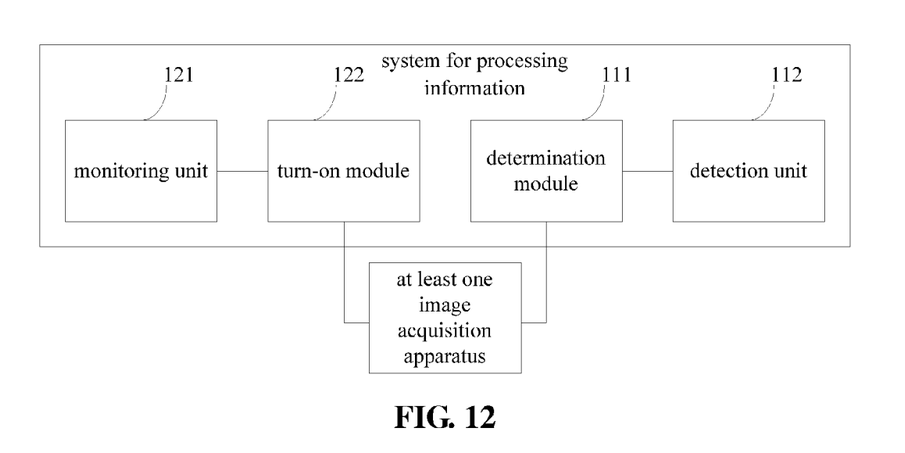
FIG. 12 is a schematic structural diagram of another information processing system according to an embodiment of the disclosure.

On the basis of the embodiment shown in FIG. 11, in the case that the electronic device has the first panel and the second panel, a schematic structural diagram of another information processing system according to an embodiment of the disclosure is shown in FIG. 12, and may also include a monitoring module 121 and a turn-on module 122.

Specifically, the monitoring module 121 is configured to monitor an angle between the first panel and the second panel.

In the embodiment of the disclosure, the angle between the first panel and the second panel becomes less gradually, when the first surface of the first panel and the first surface of the second panel is approaching each other; the angle between the first panel and the second panel becomes greater gradually, when the first surface of the first panel and the first surface of the second panel is keeping away from each other.

Specifically, the turn-on module 122 is configured to turn on the at least one image acquisition apparatus in the case that the angle between the first panel and the second panel that is monitored by the monitoring module is greater than a preset threshold.

In the embodiment of the disclosure, in the case that the angle between the first panel and the second panel is greater than the preset threshold, it is indicated that the electronic device is in a tent mode, as shown in FIG. 4.

That is, in the embodiment of the disclosure, in the case that the electronic device is in the tent mode, the at least one image acquisition apparatus is turned on automatically, without turning on the at least one image acquisition apparatus manually by a user, and thus operation by the user is simplified.

Figure 13:
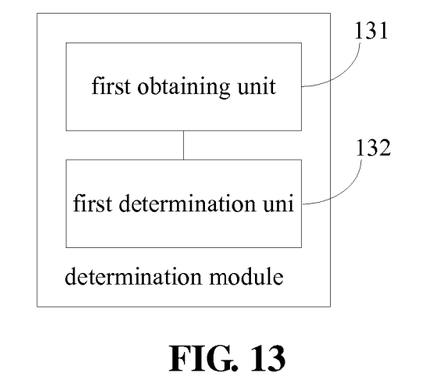
FIG. 13 is a schematic diagram of a structure of a determination module according to an embodiment of the disclosure.

According to the above embodiments, optionally, in the case that the first surface of the first panel is provided with one image acquisition apparatus, a schematic diagram of a structure of the determination module 111 is shown in FIG. 13, and may include a first obtaining unit 131 and a first determination unit 132.

Specifically, the first obtaining unit 131 is configured to obtain edge data of the to-be-recognized object and edge data of the plane.

Specifically, the first determination unit 132 is configured to determine that the to-be-recognized object contacts the plane in the case that there is an intersection between the edge data of the to-be-recognized object and the edge data of the plane.

Figure 14:
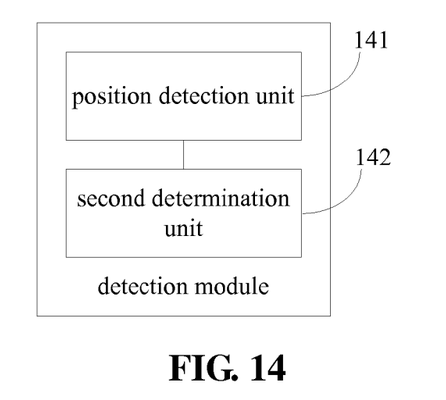
FIG. 14 is a schematic diagram of a structure of a detection module according to an embodiment of the disclosure.

On the basis of the embodiment shown in FIG. 13, a schematic diagram of a structure of the detection module 112 according to an embodiment of the disclosure is shown in FIG. 14, and may include a position detection unit 141 and a second determination unit 142.

Specifically, the position detection unit 141 is configured to detect a position of the to-be-recognized object in the image frame-by-frame in the case that the determination module determines that the to-be-recognized object contacts the plane.

Specifically, the second determination unit 142 is configured to determine that the position of the to-be-recognized object changes in the case that the position of the to-be-recognized object in the image changes.

Figure 15:
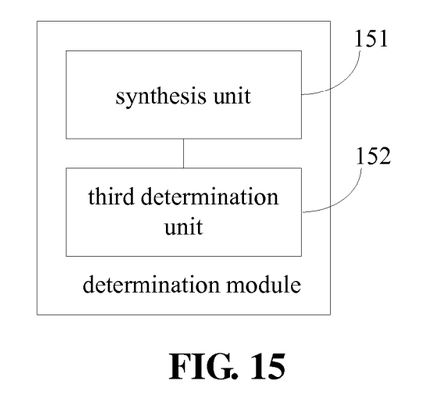
FIG. 15 is a schematic diagram of another structure of a determination module according to an embodiment of the disclosure.

According to the above embodiments, optionally, in the case that the first surface of the first panel is provided with at least two image acquisition apparatuses, a schematic diagram of another structure of the determination module 111 is shown in FIG. 15, and may include a synthesis unit 151 and a third determination unit 152.

Specifically, the synthesis unit 151 is configured to synthesize images acquired at the same time by the at least two image acquisition apparatuses into a frame of depth image that carries coordinates of the to-be-recognized object and coordinates of points in the plane.

Specifically, the third determination unit 152 is configured to determine whether the to-be-recognized object contacts the plane based on the coordinates of the to-be-recognized object and the coordinates of points in the plane.

Figure 16:
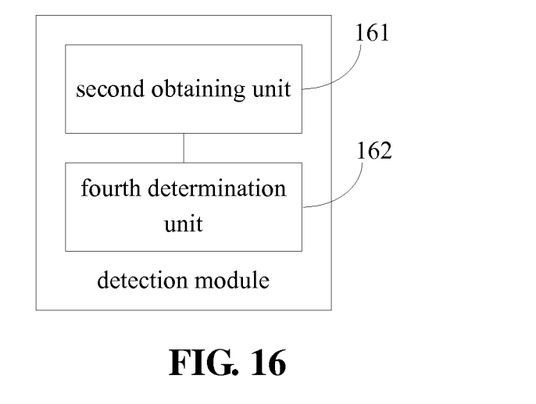
FIG. 16 is a schematic diagram of another structure of a detection module according to an embodiment of the disclosure.

On the basis of the embodiment shown in FIG. 15, a schematic diagram of another structure of the detection module 112 according to an embodiment of the disclosure is shown in FIG. 16, and may include a second obtaining unit 161 and a fourth determination unit 162.

Specifically, the second obtaining unit 161 is configured to obtain coordinates of the to-be-recognized object that are carried in two adjacent frames of depth images.

Specifically, the fourth determination unit 162 is configured to determine that the position of the to-be-recognized object changes in the case that a first group of coordinates of the to-be-recognized object and a second group of coordinates of the to-be-recognized object that are respectively carried in the two adjacent frames of depth images are different.

Figure 17:
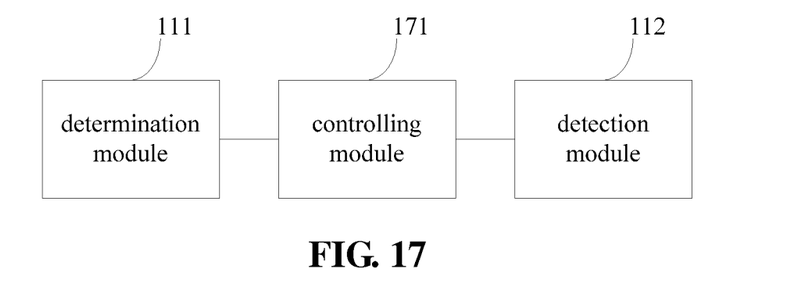
FIG. 17 is a schematic structural diagram of yet another information processing system according to an embodiment of the disclosure.

According to the above embodiments, optionally, a schematic structural diagram of yet another system for processing information according to an embodiment of the disclosure is shown in FIG. 17, and may also include a control module 171.

The control module 171 is configured to turn on the detection module in the case that the determination module determines that the to-be-recognized object contacts the plane; and turn off the detection module in the case that the determination module determines that the to-be-recognized object separates from the plane.

In the embodiments of the disclosure, in order to reduce power consumption, in the case that it is detected that the to-be-recognized object separates from the plane, the detection for the position-changed information of the to-be-recognized object is stops.

There is provided an electronic device according to an embodiment of the disclosure, the electronic device has the system for information according to any one of the above embodiments.

The above descriptions of the disclosed embodiments enable those skilled in the art to implement or use the present disclosure. Various modifications made to those embodiments will be obvious to those skilled in the art, and the ordinal principles defined in the present disclosure can be implemented in other embodiments without departing from the spirit or the scope of the present disclosure. Therefore, the disclosure should not be limited to those embodiments disclosed herein, but should be in coincidence with the widest scope in accordance with the principles and the novel characteristics disclosed in the disclosure.

The invention claimed is:

1. An information processing method for an electronic device, the electronic device including an image acquisition apparatus and a processor, the information processing method comprising:
   acquiring, by the image acquisition apparatus, an image for an object and a plane on which the electronic device stands;
   determining, by the processor, whether the object contacts the plane based on the acquired image;
   detecting, by the processor, position-changed information of the object in response to the object contacting the plane; and
   in response to the object separating from the plane, discontinuing the detecting the position-changed information of the object.

2. The method according to claim 1, wherein the method further comprises, before acquiring the image for the object and the plane:
   obtaining, by the processor, an angle between a first panel and a second panel of the electronic device; and
   turning on, by the processor, the image acquisition apparatus of the electronic device in response to the angle between the first panel and the second panel being greater than a preset threshold.

3. The method according to claim 1, wherein determining, by the processor, whether the object contacts the plane comprises:
   obtaining, by the processor, edge data of the object and edge data of the plane; and
   determining, by the processor, that the object contacts the plane in response to detecting an intersection between the edge data of the object and the edge data of the plane.

4. The method according to claim 3, wherein detecting, by the processor, the position-changed information of the object comprises:
   detecting, by the processor, a position of the object in the image frame-by-frame; and
   determining, by the processor, that the position of the object changes in response to detecting that the position of the object in the image changes from one frame to another.

5. The method according to claim 1, wherein determining, by the processor, whether the object contacts the plane based on the acquired image comprises:
   synthesizing, by the processor, images acquired at the same time by at least two image acquisition apparatuses of the electronic device into a frame of depth image that carries coordinates of the object and coordinates of points in the plane, wherein the at least two image acquisition apparatuses includes the image acquisition apparatus; and
   determining, by the processor, whether the object contacts the plane based on the coordinates of the object and the coordinates of the points in the plane.

6. The method according to claim 5, wherein detecting, by the processor, the position-changed information of the object comprises:
   obtaining, by the processor, a first group of coordinates of the object and a second group of coordinates of the object that are respectively carried in two adjacent frames of depth images; and
   determining, by the processor, that the position of the object changes in response to detecting that the first group of coordinates and the second group of coordinates are different.

7. An information processing system applied to an electronic device including a first panel, wherein a first surface of the first panel is provided with an image acquisition apparatus, wherein the image acquisition apparatus acquires an image for an object and a plane, and wherein the system comprises a processor that is configured to:
   determine whether the object contacts the plane based on the image acquired by the image acquisition apparatus;
   detect position-changed information of the object in response to the object contacting the plane; and
   in response to the object separating from the plane, stop detection of the position-changed information of the object.

8. The system according to claim 7, wherein the electronic device has the first panel and a second panel, wherein the first panel and the second panel are movably connected through a rotating shaft, and wherein the processor is further configured to:
   obtain an angle between the first panel and the second panel; and
   turn on the image acquisition apparatus in response to the angle between the first panel and the second panel being greater than a preset threshold.

9. The system according to claim 7, wherein the processor is configured to:
   obtain edge data of the object and edge data of the plane; and
   determine that the object contacts the plane in response to detecting an intersection between the edge data of the object and the edge data of the plane.

10. The system according to claim 9, wherein the processor is configured to:
    detect a position of the object in the image frame-by-frame in response to detecting the object contacting the plane; and
    determine that the position of the object changes in response to detecting that the position of the object in the image changes from one frame to another.

11. The system according to claim 7, wherein the first surface of the first panel is provided with at least two image acquisition apparatuses including the image acquisition apparatuses, and wherein the processor is configured to:
    synthesize images acquired at the same time by the at least two image acquisition apparatuses into a frame of depth image that carries coordinates of the object and coordinates of points in the plane; and determine whether the object contacts the plane based on the coordinates of the object and the coordinates of the points in the plane.

12. The system according to claim 11, wherein the processor is configured to:

obtain a first group of coordinates of the object and a second group of coordinates of the object that are respectively carried in two adjacent frames of depth images; and determine that the position of the object changes in response to detecting that the first group of coordinates and the second group of coordinates are different.

13. An electronic device, comprising:

a first panel that stands on a plane;

an image acquisition apparatus provided on a first surface of the first panel; and a processor configured to:

determine whether an object contacts the plane based on an image acquired by the image acquisition apparatus;

detect position-changed information of the object in response to the object contacting the plane; and in response to the object separating from the plane, stop detection of the position-changed information of the object.

14. The electronic device according to claim 13, wherein the electronic device has the first panel and a second panel, the first panel and the second panel are movably connected through a rotating shaft; and the processor is further configured to:

obtain an angle between the first panel and the second panel; and turn on the image acquisition apparatus in response to the angle between the first panel and the second panel being greater than a preset threshold.

15. The electronic device according to claim 13, wherein the processor is configured to:

obtain edge data of the object and edge data of the plane; and determine that the object contacts the plane in response to detecting an intersection between the edge data of the object and the edge data of the plane.

16. The electronic device according to claim 15, wherein the processor is configured to:

detect a position of the object in the image frame-by-frame in response to the object contacting the plane; and determine that the position of the object changes in response to detecting that the position of the object in the image changes from one frame to another.

17. The electronic device according to claim 13, wherein the first surface of the first panel is provided with at least two image acquisition apparatuses including the image acquisition apparatus, and the processor is configured to:

synthesize images acquired at the same time by the at least two image acquisition apparatuses into a frame of depth image that carries coordinates of the object and coordinates of points in the plane; and determine whether the object contacts the plane based on the coordinates of the object and the coordinates of the points in the plane.

18. The electronic device according to claim 17, wherein the processor is configured to:

obtain a first group of coordinates of the object and a second group of coordinates of the object that are carried in two adjacent frames of depth images; and determine that the position of the object changes in response to detecting that the first group of coordinates and the second group of coordinates are different.

* * * * *